United States Patent [19]

Niccolls

[11] 4,331,071
[45] May 25, 1982

[54] BASTING INJECTOR AND CONTROL MEANS

[76] Inventor: Paul L. Niccolls, 920 E. Villa Marie, Springfield, Mo. 65803

[21] Appl. No.: 152,083

[22] Filed: May 21, 1980

[51] Int. Cl.³ .............................. A23L 1/31; A23L 3/34
[52] U.S. Cl. .......................................... 99/532; 99/535; 417/403
[58] Field of Search .......................... 99/532, 533, 535; 92/13.8; 417/403; 222/48, 46, 387, 389

[56] References Cited

U.S. PATENT DOCUMENTS

2,755,732  7/1956  Sanderson .............................. 99/533
3,180,527  4/1965  Wasilewski et al. ................. 417/403

Primary Examiner—Philip R. Coe
Assistant Examiner—Timothy F. Simone
Attorney, Agent, or Firm—Nathaniel A. Humphries

[57] ABSTRACT

A liquid basting injector for poultry or the like has a reservoir of liquid basting material connected by a conduit to a hollow cylindrical dispensing chamber in which a dispensing piston and rod are mounted for reciprocation; power cylinder means has a power rod connected to the dispensing piston and rod for reciprocating same to draw a measured amount of basting material into the chamber and then dispense it through an injector needle connected to the chamber by a flexible hose. An adjustable stop is positioned to be engaged by the upper end of the power rod of the power cylinder for limiting the extent of movement of the power cylinder and the dispensing piston to adjust the amount of liquid basting material drawn into the dispensing chamber in accordance with a predetermined value dependent upon the weight of the poultry into which the liquid basting material is to be injected. A dial type indicator indicates the amount of liquid basting material that can be drawn into the chamber for any adjusted position of the abutment means. A circuit includes selectively and automatically operable valves for continuously reciprocating the dispensing piston for circulating cleaning between the reservoir and the injecting needles in one mode of operation or for effecting a dispensing operation of basting material under the control of a foot valve in another mode of operation.

2 Claims, 8 Drawing Figures

BASTING INJECTOR AND CONTROL MEANS

BACKGROUND OF THE INVENTION

This invention is in the field of poultry and/or red meats processing equipment and is more particularly directed to a basting injector for injecting a predetermined amount of liquid basting material into a turkey or the like.

Previous procedures for effecting the injection of basting material into turkeys or other birds have not been entirely satisfactory in that they depend upon the judgment of the operator for effecting the injection of the basting material following weighing of the bird and calculation of the amount of material to be injected. It is an easy matter for the operator to err so that more or less than the desired amount of basting material is injected. Since the amount of basting material required for any particular bird depends upon the weight of the bird, the possibility of operator or apparatus error is substantial.

Therefore, it is the primary object of this invention to provide a new and improved apparatus for injecting basting liquid into poultry or red meats.

SUMMARY OF THE INVENTION

Achievement of the foregoing objects is enabled by the preferred embodiment in which an injection needle is connected to the lower end of a dispensing chamber in which a dispensing piston is mounted for reciprocating movement by a power cylinder connected to the dispensing piston. Upon upward movement of the dispensing piston, basting liquid is drawn into the dispensing chamber so that upon downward movement of the dispensing piston the basting liquid is ejected outwardly through the flexible conduit connected to the injection needle. An adjustable vertical stop member is provided for limiting the amount of upward movement of the power cylinder and the dispensing piston so that the exact required amount of basting liquid is drawn upwardly into the dispensing chamber upon the upward movement of the dispensing piston. The position of the vertically adjustable abutment is indicated on a dial to indicate the exact amount of basting liquid that will be drawn into the chamber for subsequent injection into the particular bird of a given weight. In operation, the vertically adjustable abutment is adjusted for the weight bird to be injected and the power cylinder is then actuated to move the dispensing piston downwardly to eject the exact quantity of basting liquid into the bird or the like.

Basting material is circulated by the main supply pump. There can be any number of basting pumps on the supply system.

A better understanding of the manner in which the preferred embodiment achieves the object of the invention will be enabled when the following detailed description is considered in conjunction with the appended drawings.

DESCRIPTION OF THE PREFERRED EMBODIMENT

Figure 1:
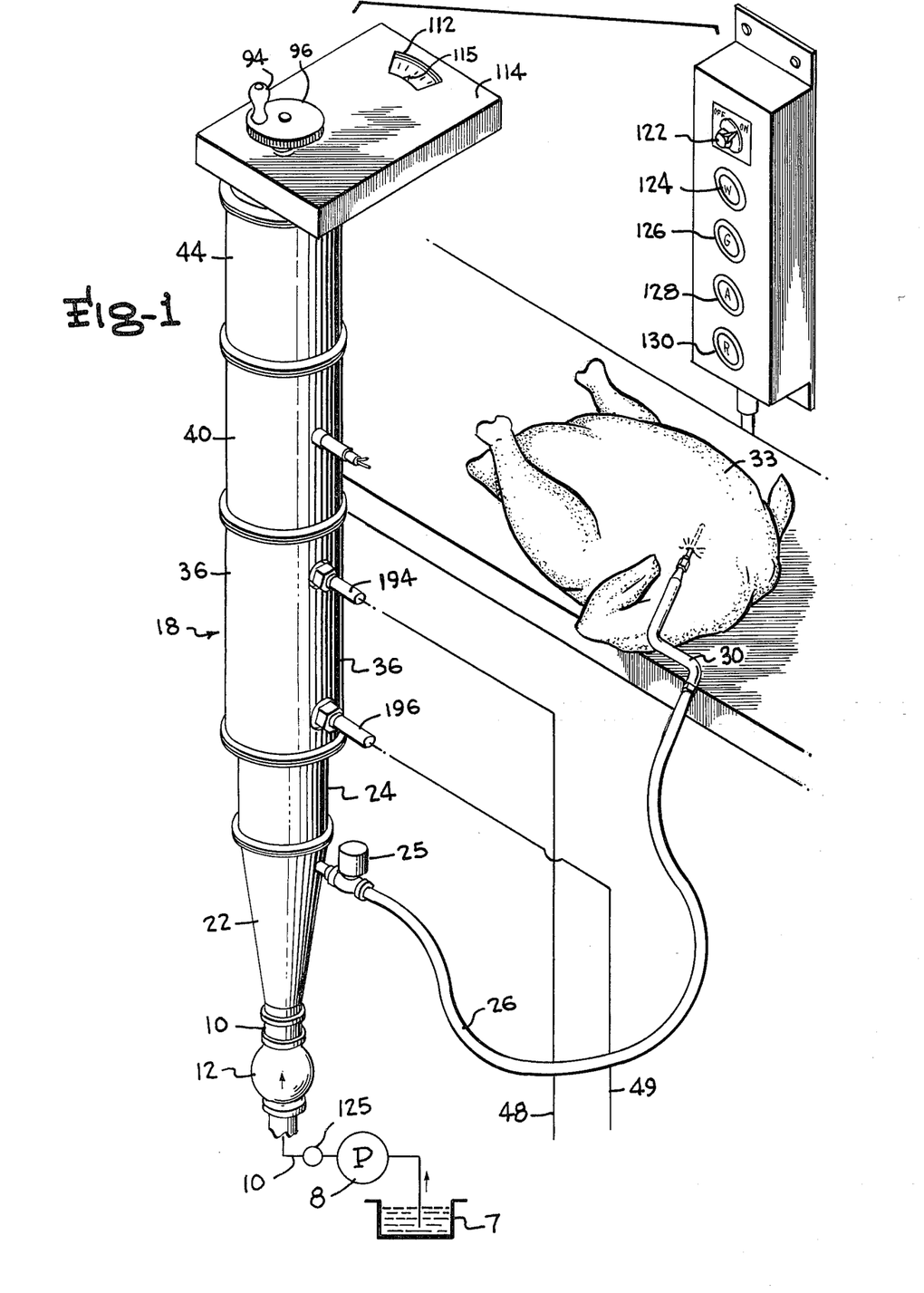
FIG. 1 is a perspective view of the primary components of the preferred embodiment.
Figure 2:
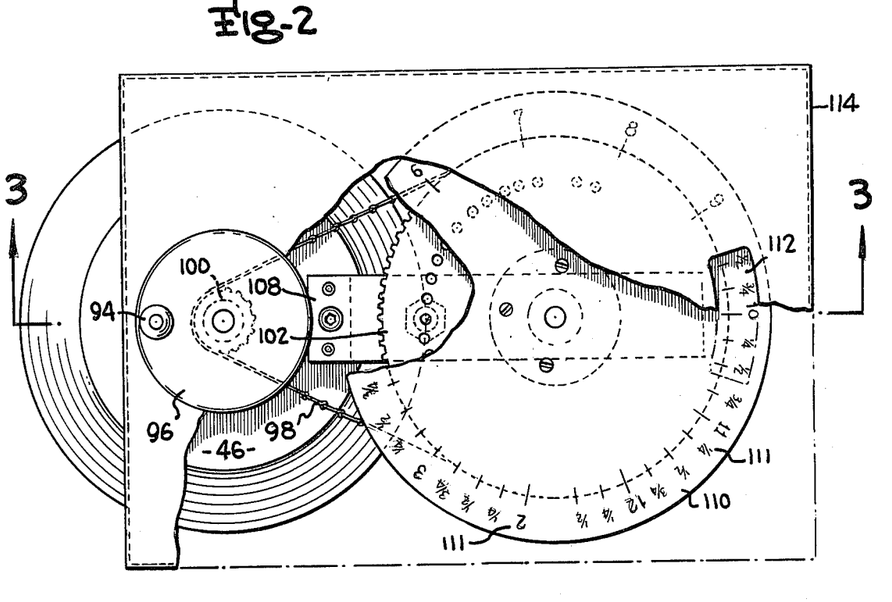
FIG. 2 is a top plan view of a portion of the preferred embodiment with parts removed for purposes of illustration of internal components.

Attention is initially invited to FIG. 1 of the drawings which illustrates the main components of the preferred embodiment including a supply conduit 10 which is supplied by a pump 8 with basting liquid from a supply reservoir 7 through a check valve 12. A hollow dispensing chamber formed in a housing generally designated 18 receives the basting liquid from conduit 10 connected on its upper end to an inflow opening in the lower end of the housing 18. Housing 18 includes an inverted conical portion 22 and a cylindrical portion 24 with a flexible hose 26 being connected to the inverted conical portion 22 on one end and to an injector needle assembly 30 of conventional design on its opposite end. A solenoid valve 25 is provided in line 26 and is controlled by limit switches in a manner discussed hereinafter. A dispensing piston 32 connected to a rod 34 is mounted for reciprocation in the cylindrical portion 24 of the housing 18.

Figure 3:
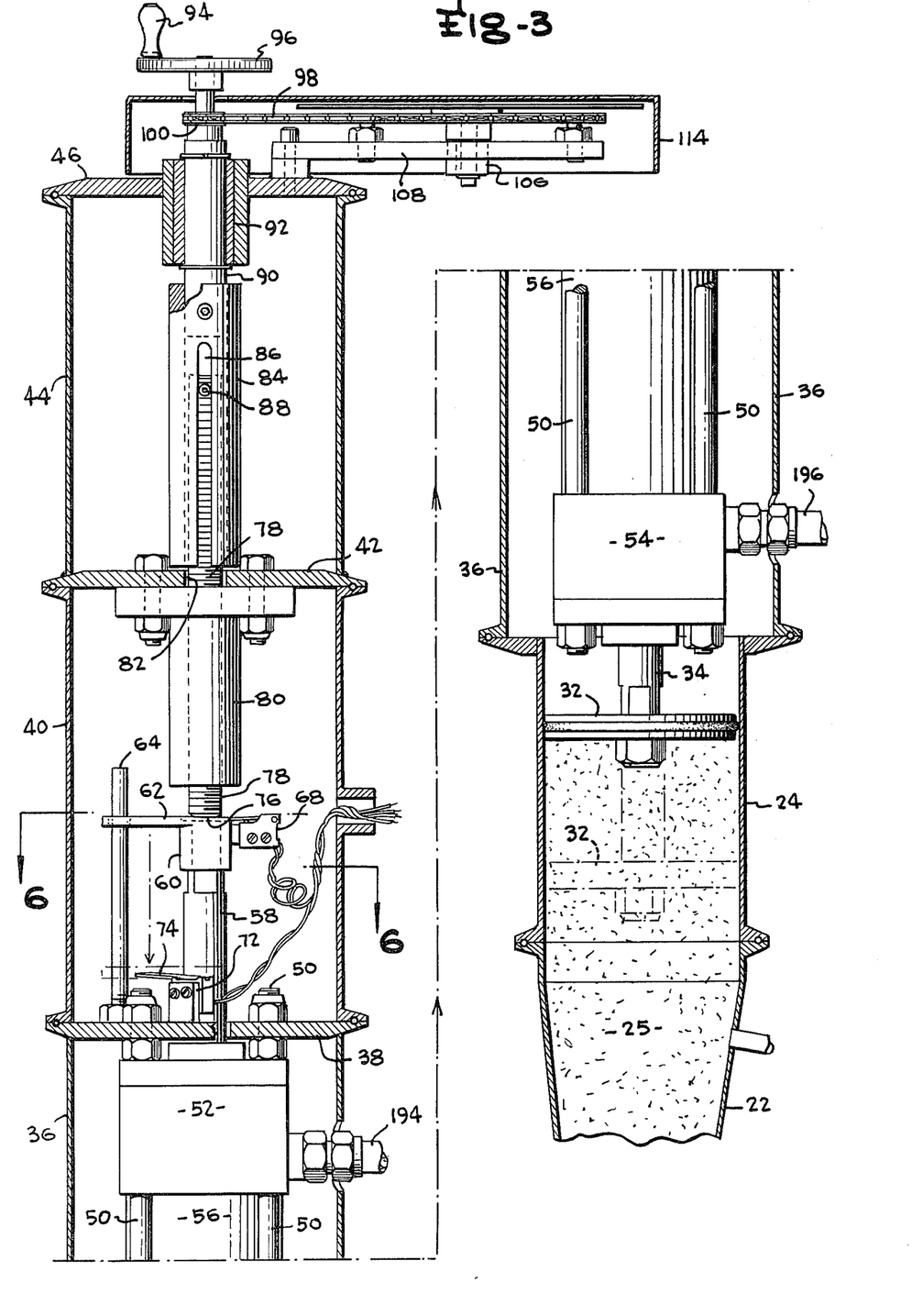
FIG. 3 is a bisecting sectional view taken along lines 3—3 of FIG. 2.

The uppermost portions of housing 18 above the cylindrical portion 24 are of larger diameter and include a power cylinder enclosure 36 across the upper end of which an apertured transverse flange plate 38 extends as shown in FIG. 3. A cylindrical housing 40 is positioned above the transverse flange plate 38 with a second transverse flange plate 42 extending across the upper end of housing 40. An uppermost cylindrical housing 44 is welded to the upper surface of the second transverse flange plate 42 and is enclosed at its upper end by an upper cap plate 46.

Transverse flange plate 38 provides support for four downwardly extending head block support rods 50 which support an upper head block 52 and a lower head block 54 of a power cylinder 56 extending between the respective head block as clearly shown in FIG. 3. Power cylinder 56 includes an internal piston 57 (FIG. 8) connected to the rod 34 which is connected on its opposite end to the dispensing piston 32 in cylindrical portion 24. Additionally, an upper follower rod 58 extends upwardly through upper head block 52 and is connected at its lower end to the power piston in power cylinder 56 for concurrent following movement therewith. A cap member 60 is mounted on the upper end of the rod 58 and includes a transversely extending arm plate 62 having an aperture slidably fitted over a fixedly positioned vertical guide pin 64.

Figure 6:
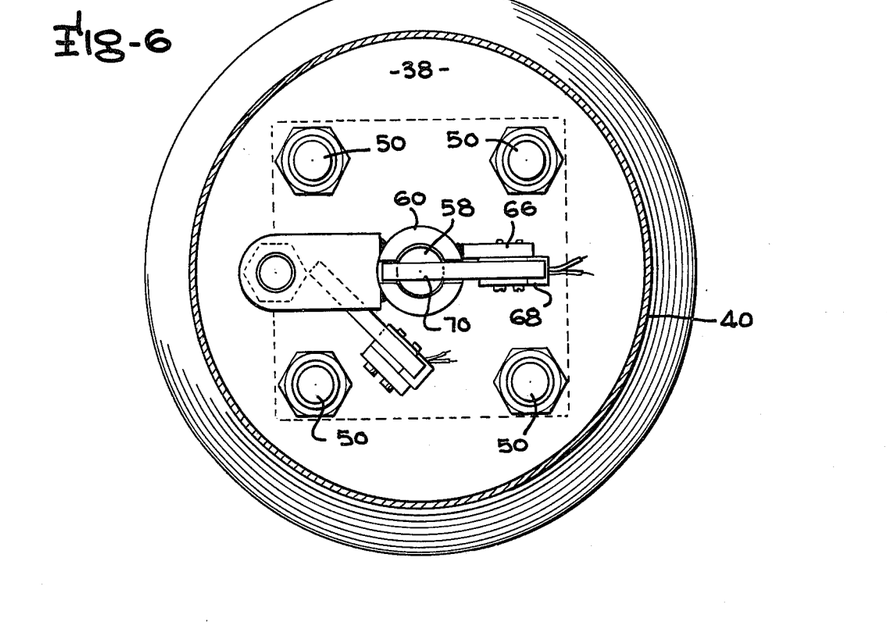
FIG. 6 is a sectional view taken along lines 6—6 of FIG. 3.
Figure 7:
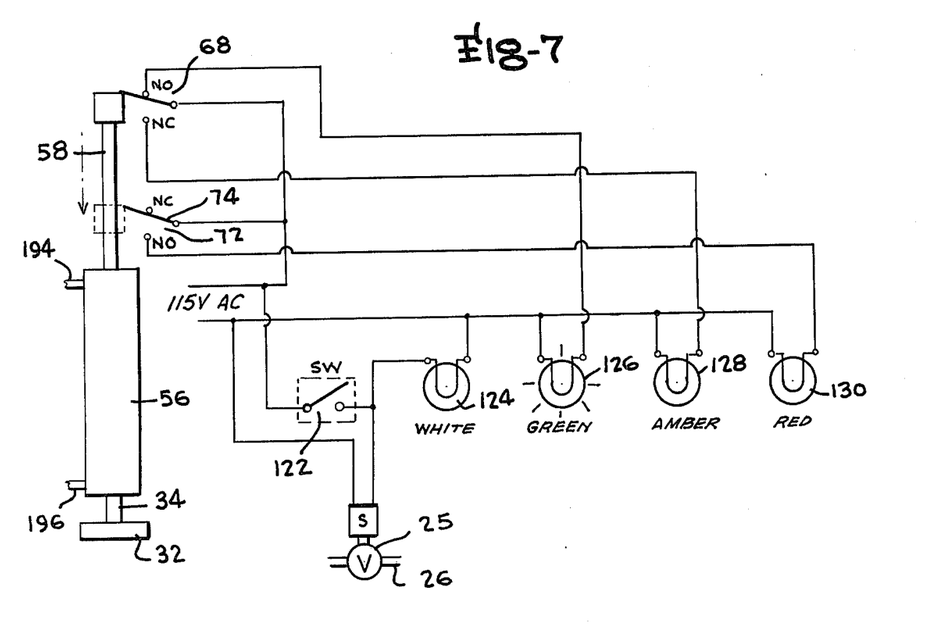
FIG. 7 is a schematic of electrical and pneumatic components of the preferred embodiment.

Additionally, a microswitch support arm 66 (FIG. 6) extends outwardly from cap 60 to provide support for a microswitch 68 mounted thereon. An actuator 70 on microswitch 68 extends above the upper end of the rod 58 and cap 60 as best shown in FIG. 6. A lower microswitch 72 is mounted on the transverse flange plate 38 and has an actuator arm 74 positioned to be engaged by the transverse plate 62 when the power piston in power cylinder 56 is moved downwardly to its lower extent of movement. Upward movement of upper follower rod 58 is limited by the lower downwardly facing end surface 76 of a threaded stop rod 78.

Threaded stop rod 78 is threadably connected to internal threads in a fixedly positioned vertical support sleeve 80 fastened at its upper end to the second transverse flange plate 42 which is provided with an aperture 82 through which threaded rod 78 extends as best shown in FIG. 3. An unthreaded rotatable drive sleeve 84 has diametrically opposed slots 86 extending along a substantial portion of its length and a simple bore enclosing the threaded stop rod 78. Relative movement of the stop rod 78 axially with respect to the drive sleeve 84 is unrestricted. However, a transverse drive pin 88 extends outwardly of the upper end of the threaded stop rod 78 through the slots 86 so that rotation of the drive sleeve 84 will effect rotation of the threaded rod 78 to cause axial reciprocation of the threaded rod 78 upwardly and downwardly with respect to the support sleeve 80 and the drive sleeve 84, etc.

Figures 4, 5:
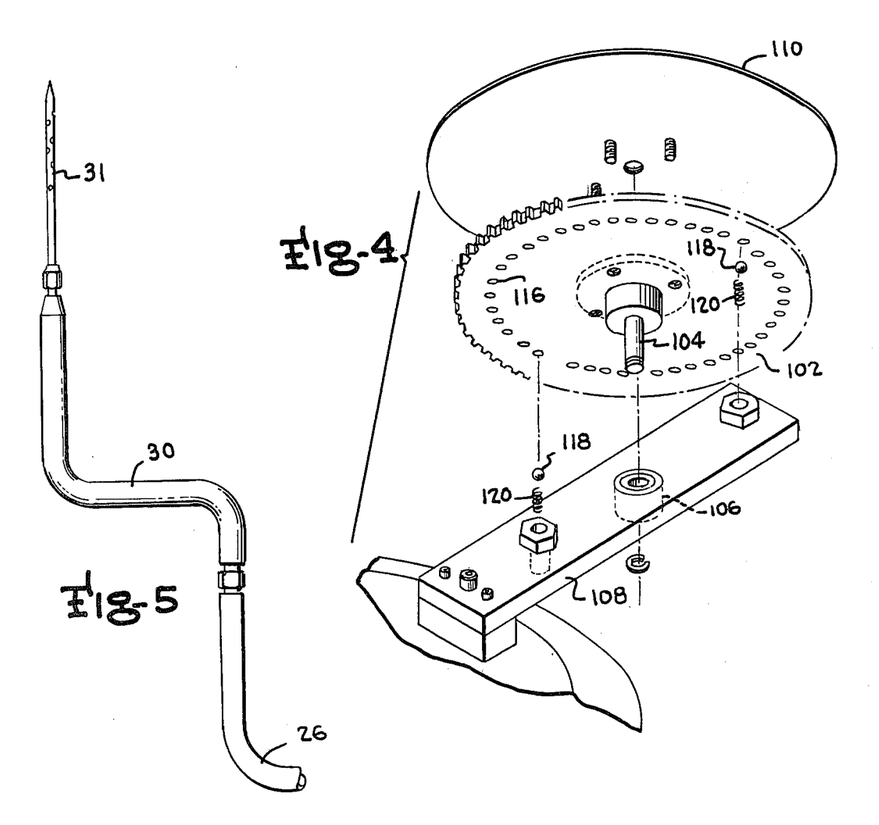
FIG. 4 is an exploded perspective view of a portion of the preferred embodiment.
FIG. 5 is a perspective view of the injector means employed in the preferred embodiment.

Rotary positioning of drive sleeve 84 is effected by a drive shaft 90 drivingly connected to the upper end of the drive sleeve 84 and supported in rotary bushing means 92 provided axially within the cap plate 46. A handle 94 on a drive disc 96 keyed to the upper end of drive shaft 90 effects rotation of the drive shaft in an obvious manner. A chain 98 extends about a sprocket 100 keyed to the shaft 90 and also extends about a much larger sprocket 102 fixedly connected to an idler shaft 104 mounted for rotation in a bushing 106 on the outer end of a support arm 108 attached at its other end to the cap plate 46 as best shown in FIG. 3. An indicia plate 110 having a series of indicia 111 about its outer periphery is attached to the upper surface of the large diameter sprocket 102 with the indicia 111 representing the quantity of basting material to be dispensed and visible through a window 112 in the cover and being alignable with a pointer 115 as shown in FIG. 1. Detents 116 extend about the periphery of the large sprocket 102 and are engaged by spring urged detent balls 118 (FIG. 4) so that the sprocket 102 can be rotated to a desired position in which it is held by the detent means 116, 118 in an obvious manner. However, the force of spring 120 is easily overcome so that the adjustment of the disc from one rotary position to another is easily effected.

Figure 8:
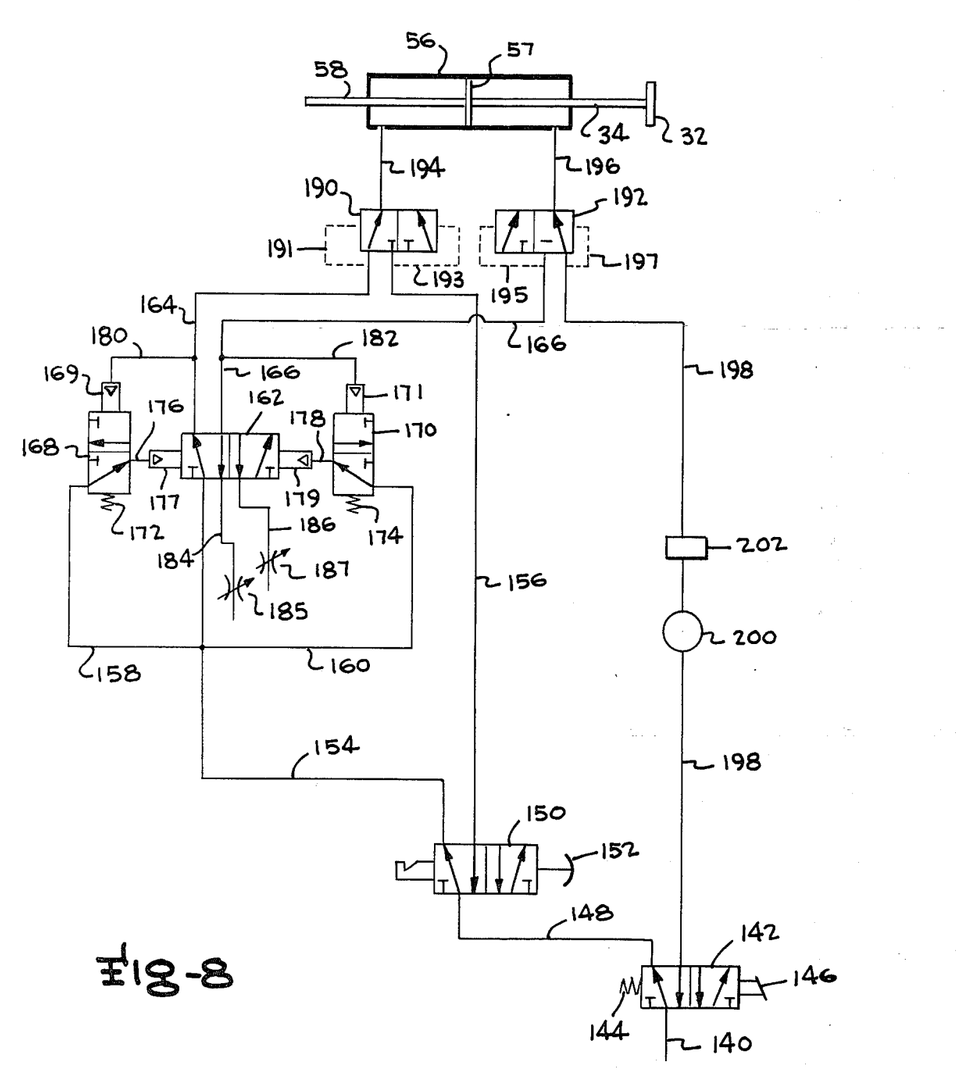
FIG. 8 is a schematic flow diagram of the pneumatic circuitry of the preferred embodiment.

FIG. 8 illustrates the pneumatic control circuit for controlling the power cylinder 56 which circuitry includes a pressurized air supply line 140 providing pressurized air to a dispense actuate foot valve 142 having a spring 144 and a foot pedal 146. Spring 144 normally maintains the foot valve 142 in the position illustrated in FIG. 8 while actuation of the foot pedal 146 moves it to the reverse position.

A power supply line 148 is connected to the foot valve 142 and to a manually operated four-way mode select valve 150 having a palm actuator 152 which can be positioned in either a "circulate" or "operate" position to respectively connect the power supply line 148 to either a circulate mode supply line 154 as shown in FIG. 8 or to an injection mode supply line 156 in which event line 154 is vented to atmosphere. Circulate mode supply line 154 is connected to a left pilot line 158 and a right pilot line 160 with the end of line 154 being connected to a double pilot control valve 162 to which a left shuttle valve line 164 and a right shuttle valve line 166 are connected.

Left pilot supply line 158 is connected to a left pilot valve 168 while right pilot supply line 160 is connected to a right pilot valve 170 with spring 172 and 174 normally serving to respectively position the left and right pilot valves 168 and 170 in first positions illustrated in FIG. 8. Left and right valve actuate pilot lines 176 and 178 respectively extend from the left pilot valve 168 and right pilot valve 170 to left and right pilot chambers 177 and 179 of the double pilot control valve 162. Left pilot control line 180 is connected between the left shuttle valve line 164 and the left pilot chamber 169 of the left pilot valve 168 while right pilot control line 182 is similarly connected between the right shuttle valve line 166 and the right pilot chamber 171 of the right pilot valve 170. It should be observed that the introduction of air pressure into left pilot control line 180 will serve to effect a shifting movement of the left pilot valve 168 from the position illustrated in FIG. 8 to a second position in which left valve actuate pilot line 176 is blocked and left pilot supply line 158 is vented to atmosphere. Similarly, the introduction of air pressure into right pilot control line 182 will serve to shift the right pilot valve 170 from the illustrated position of FIG. 8 to a second position in which valve actuate pilot line 178 is blocked and right pilot supply line 160 is vented to atmosphere. It should also be observed that the double pilot control valve 162 is also connected to first and second exhaust lines 184 and 186 which respectively include adjustable flow control means 185 and 187 for varying the rate of flow posible through the respective line.

Left shuttle valve line 164 is connected to a left shuttle valve 190 while the right shuttle valve line 166 is connected to a right shuttle valve 192. The upper (head) end of power cylinder 56 is connected by a first power cylinder line 194 to the left shuttle valve 190 whereas the lower (rod) end of power cylinder 56 is connected by a second power cylinder line 196 to the right shuttle valve 192. Line 156 is also connected to the left shuttle valve 190 and a dispense mode supply line 198, which includes pressure reducer 200 and a quick-exhaust 202, extends between the foot valve 142 and the right shuttle valve 192.

It should be observed that the left shuttle valve 190 includes a left shuttle shift pilot line 191 connected to the left shuttle valve line 164 and a right shuttle shift pilot line 193 connected to injection mode supply line 156. Similarly, the right shuttle valve 192 includes a first shuttle shift pilot line 195 connected to one end of the valve and to the right shuttle valve line 166 and a second shuttle shift pilot line 197 connected between the dispense mode supply line 198 and the opposite end of the valve.

A complete cycle of operation in the "circulate" mode begins with the connection of conduit 10 to a source of cleaning solution by valve means (not shown). Power cylinder 56 is in its lower extended position by virtue of the fact that the control circuitry components are in the positions illustrated in FIG. 8. A main switch 122 is turned on so that a white pilot light 124 is illuminated to indicate the system is operational. Switch 122 also serves to actuate and open a solenoid valve 125 in the conduit 10.

With the parts being in the positions illustrated in FIG. 8, pressurized air flows from air supply line 140 to power supply line 148, through manually operable mode valve 150 to line 154 to the double pilot control valve 162. The pressure from line 154 is directed into line 158 and through the left pilot valve 168 to line 176 to the left pilot chamber 177 while the pressure in right pilot line 160 is similarly directed to the right pilot valve 170 to line 178 and the right pilot chamber 179. Forces on the axially movable valve spool of the double pilot control valve 162 are consequently balanced and the valve remains in the illustrated position momentarily. However, pressurized air flowing from line 154 through valve 162 enters left shuttle valve line 164 to pressurize line 180 and pilot chamber 169 to cause the left pilot valve 168 to move from the position illustrated in FIG. 8 to its other possible position in which the pressure from line 158 to left pilot chamber 177 is terminated so that the only axial forces acting on the spool of the double pilot control valve 162 are the forces provided by the right pilot chamber pressure 179 which shifts the valve spool from the illustrated position of FIG. 8 to its other position in which the pressure in line 154 is directed to the right shuttle valve line 166.

The pressure in right shuttle valve line 166 works through pilot line 195 to shift right shuttle valve 192 from the position illustrated in FIG. 8 to its other position so that pressure in line 166 is directed into line 196 to cause piston 57 and attached rods 34 and 58 to begin to move upwardly so that switch 72 is actuated and valve 25 is closed and dispensing piston 32 moes upwardly so as to draw the cleaning liquid into the cylindrical portion 24. Such movement is unopposed by virtue of the fact that the preceeding movement of the spool of double pilot control valve 162 to its left position vents line 164 to atmosphere. Upward movement of the rod 58 is terminated by engagement of the upper end of rod 58 with the lower end 76 of the stop rod 78 with switch 68 being simultaneously actuated and valve 125 opened.

During upward movement of piston 57, pressure in line 164 is maintained at a sufficient level by the restriction in exhaust regulator 185 to hold the left pilot valve 168 in its "lower" position; however, when piston 57 stops moving upwardly, the pressure in line 164 falls to a low level and spring 172 exerts sufficient force on the left pilot valve 168 to shift the left pilot valve back to the "upper" position illustrated in FIG. 8. Pressure in line 158 is consequently directed into pilot chambr 177 to shift double pilot control valve 162 to the "right" illustrated position of FIG. 8 which shifting movement is permitted by virtue of the fact that the right pilot valve 170 is in its lower position and there is no pressure supply to right pilot chamber 179. Air pressure consequently flows from line 154 through line 164 and left shuttle valve 190 to line 194 to cause piston 57 etc. to move downwardly with such movement being permitted by virtue of the fact that line 196 is connected through the right shuttle valve 192 to line 166 to vent through the variable restrictor 185. Cleaning liquid is consequently forced outwardly through hose 26 and needle 31; a check valve (not shown) prevents return of the cleaning fluid to its source.

When the piston 57 reaches the bottom of its stroke, pressure in line 166 falls below a predetermined value to lower the pressure in pilot chamber 179 so that the spring 174 becomes effective to shift the right shuttle valve 170 to the "upper" position illustrated in FIG. 8 which in conjunction with the fact that the pressure in line 164 will have shifted the left valve 168 to its non-illustrated "lower" position, will serve to initiate a further cycle of operation. Thus, it will be seen that the piston 57 reciprocates back and forth to circulate the cleaning liquid by pulling the cleaning liquid up through the check valve and then forcing it outwardly through hose 26 and needle 31.

The initiation of an injecting operation is begun by actuating the palm actuator 152 of valve 150 to move it to its non-illustrated "operate" position in which line 154 is vented to atmosphere and power supply line 148 is connected to line 156. Line 148 flows through line 156 to the left shuttle valve 190 and acts through pilot line 193 to shift the left shuttle valve 190 to its leftmost position for directing the air pressure in line 156 to line 194 to consequently move piston 57 to the bottom end of its stroke. Movement of piston 57 to the bottom end of its stroke is permitted by virtue of the fact that line 196 is connected to exhaust. When the piston 57 reaches the bottom of its stroke, it simply remains in such position until such time as the foot actuated valve 142 is actuated by engagement of peddle 146 by the foot of the user.

The needle 31 is inserted in the bird 33 as shown in FIG. 1 and the handle 94 is adjusted to provide the proper vertical adjustment of the rod 78 in accordance with the amount of basting liquid required for injection into the particular bird. Movement of foot valve peddle 146 to its left or non-illustrated position of FIG. 8 causes the venting of line 148 and the connection of the compressed air supply line 140 to the line 198. Pressure in line 198 acts through pilot line 197 to shift the right shuttle 192 to the illustrated position of FIG. 8 so that the pressure from line 198 flows into line 196 and moves the piston upwardly until the upper end of rod 58 engages the lower end 76 of the stop rod 78 to draw the exact desired amount of basting liquid upwardly into the cylindrical porion 24 and close microswitch 68 to illuminate green pilot light 126 to indicate that the system is "ready" for the injection operation. The regulator 200 insures that sufficiently low pressure for satisfactory operation is maintained. Since the line 194 is connected to exhaust, upward movement of piston 57 is unimpeded.

Upon release of the foot valve 142, spring 144 shifts the foot valve 142 to the position illustrated in FIG. 8 so that air pressure from line 140 flows through line 148 through mode valve 150 to line 156 to shift the left shuttle valve 190 to its left position by virtue of the application of pressure through pilot line 193 so that the air pressure from line 156 is directed into line 194 to initiate movement of piston 57 downwardly so that switch 68 deactivates the green pilot light and activates amber light 128 to indicate that injection is in process. Movement of piston 32 forces the basting material outwardly through the hose 26 to injector needle assembly 30 since valve 25 and check valve 12 are closed. Exhaust from the lower side of cylinder 56 flows through line 196 and right shuttle 192 to line 198 to exit via the quick exhaust 202. Movement of rod 58 to the bottom of its stroke effects the closing of microswitch 75 to illuminate red pilot light 130 to indicate completion of the injection operation and effect closure of valve 25.

Upon completion of the injection into the particular bird, the next bird is weighed and placed in position and the needle inserted. Handle 94 is rotated to provide proper adjustment of the required indicia with pointer 115 in accordance with the weight of the second bird. The cycle is then repeated by actuation of foot peddle 146.

Thus, it will be seen that the present invention provides a unique and fool-proof apparatus for injecting the exact amount of basting material into a bird or the like. Numerous modifications of the preferred embodiment will undoubtedly occur to those of skill in the art. For example, valve 14 can be solenoid controlled, a pressure responsive check valve or even illuminated with the use of a modified version of check valve 12. Also, valves 14 and 152 can be replaced by electrical timer switch control for valve means performing the functions of these valves. Therefore, it should be understood that the spirit and scope of the invention is to be limited solely by the appended claims.

I claim:

1. A basting injector comprising:
a reservoir containing a quantity of liquid basting material;
a hollow housing including a hollow cylindrical dispensing chamber;
a dispensing piston and rod mounted for reciprocation in said cylindrical chamber portion;
power cylinder means having a power rod extending from said power cylinder means and connected to said dispensing piston and rod;
a supply conduit connected on one end to said reservoir and on an opposite end to an inflow opening in said housing and dispensing chamber;
a flexible hose having one end communicating with said housing and dispensing chamber at a location between said cylindrical chamber portion and said inflow opening and an opposite end connected to an injector needle assembly;
a source of compressed air;
pneumatic control means for connecting said source of compressed air to said power cylinder to cause movement of said dispensing piston in a first direction to draw basting liquid into said dispensing chamber from said fill conduit or in a second direction to effect the dispensing of basting material from said dispensing chamber into said flexible conduit; said pneumatic control means including a two-position dispense actuate valve connected to said source of compressed air, a manual mode select valve selectively positionable in a circulate position or an operate position, a power supply line extending from one side of said manual mode select valve to said dispense actuate valve, a double pilot control valve having a left pilot valve and right pilot valve operable for positioning said double pilot control valve in first or second positions respectively, a circulate mode supply pneumatic line extending between said manual mode select valve and said double pilot control valve, spring means associated with said left pilot valve for normally maintaining said left pilot valve in a first position, spring means for normally maintaining said right pilot valve in a first position, a left pilot line connecting said left valve to said circulate mode supply line, a right pilot line connecting said right pilot valve to said circulate mode supply line, a left pilot chamber and a right pilot chamber respectively associated with said double pilot control valve for receiving pressurized air respectively from said left pilot valve and said right pilot valve, said left pilot valve and said right pilot valve each having a pilot chamber which, when subjected to a predetermined pressure, is operable to overcome the force of said spring means associated with said left pilot valve and said right pilot valve respectively, a left shuttle valve line and a right shuttle valve line respectively connected on one end to said double pilot control valve, a left pilot valve, a second power cylinder line connected between said right shuttle valve and the rod end of the power cylinder, a first shuttle shift pilot line connected between the right shuttle valve line and one side of said right shuttle valve tending to move said right shuttle valve into a first position in which said right shuttle valve line is placed in communication with said second power cylinder line, a second shuttle shift pilot line connecting said dispense mode supply line with an opposite end of said right shuttle valve wherein pressure in said dispense mode supply line tends to move said right shuttle valve to a second position in which said dispense mode supply line is connected to said second power cylinder line and lastly including selectively operable flow regulator means connected to said double pilot control valve for regulating the flow of exhaust air from said power cylinder;
adjustable stop means for limiting the extent of movement of said power cylinder and said dispensing piston in said first direction to permit adjustment of the amount of liquid basting material drawn into said dispensing chamber in accordance with a predetermined value dependent upon the weight of the object into which the liquid basting material is to be injected;
a check valve in said supply conduit for permitting flow of basting material from said reservoir to said fill conduit while preventing reverse flow back to said reservoir; and
indicator means for indicating the amount of liquid basting material that can be drawn into said dispensing chamber for any adjusted position of said abutment means.

2. A basting injector comprising:
a reservoir containing a quantity of liquid basting material;
a hollow housing including a hollow cylindrical dispensing chamber;
a dispensing piston and rod mounted for reciprocation in said cylindrical chamber portion;
power cylindrical means having a power rod extending from said power cylinder means and connected to said dispensing piston and rod;
a supply conduit connected on one end to said reservoir and on an opposite end to an inflow opening in said housing and dispensing chamber;
a flexible hose having one end communicating with said housing and dispensing chamber at a location between said cylindrical chamber portion and said inflow needle assembly;
a source of compressed air;
pneumatic control means for connecting said source of compressed air to said power cylinder to cause movement of said dispensing piston in a first direction to draw basting liquid into said dispensing chamber from said fill conduit or in a second direction to effect the dispensing of basting material from said dispensing chamber into said flexible conduit wherein said pneumatic control means includes a two-position dispense actuate valve connected to said source of compressed air, a manual mode select valve selectively positionable in a circulate position or an operate position, a power supply line extending from one side of said manual mode select valve to said dispense actuate valve, a double pilot control valve having a left pilot valve and right pilot valve operable for positioning said double pilot control valve in first or second positions respectively, a circulate mode supply pneumatic line extending between said manual mode select valve and said double pilot control valve, spring means associated with said left pilot valve for normally maintaining said left pilot valve in a first position, spring means for normally maintaining said right pilot valve in a first position, a left pilot line connecting said left valve to said circulate mode supply line, a right pilot line connecting said right pilot valve to said circulate mode supply line, a left pilot chamber and a right pilot chamber respectively associated with said double pilot control valve for receiving pressurized air respectively from said left pilot valve and said right pilot valve, said left pilot valve and said right pilot valve each having a pilot chamber which, when subjected to a predetermined pressure, is operable to overcome the force of said spring means associated with said left pilot valve and said right pilot valve respectively, a left shuttle valve line and a right shuttle valve line respectively connected on one end to said double pilot control valve, a left pilot control line extending between said left shuttle valve line and said pilot chamber of said left pilot valve, a right pilot control line extending between said right shuttle valve line and said right pilot valve chamber, said left shuttle valve line being connected to a left shuttle valve, said right shuttle valve line being connecting to a right shuttle valve, a left shuttle shift pilot line connecting said left shuttle valve line to said left shuttle valve whereby pressure in said left shuttle shift valve line tends to position said left shuttle valve in a first position, a dispense mode supply line connected on one end to said dispense actuate valve to exhaust through said dispense actuate valve when said dispense actuate valve is in its first position and to be connected to said power supply line when said dispense actuate valve is in its second position and having a second end connected to said left shuttle valve, a second shuttle shift pilot line connecting to said dispense mode supply line to an opposite side of said left shuttle valve so that pressure in said dispense mode supply line tends to move said right shuttle valve to a second position, a first power cylinder line connecting to said left mode shuttle valve to one end of said power cylinder whereby said left shuttle valve line is connected to said one end of said power cylinder when said left shuttle valve is in its first position and is connected to said injection mode supply line when said left shuttle valve is in its second position, a right shuttle valve connected to said right shuttle valve line, a dispense mode supply line extending between said dispense actuate valve and said right shuttle valve, a second power cylinder line connected between said right shuttle valve and the rod end of the power cylinder, a first shuttle shift pilot line connected between the right shuttle valve line and one side of said right shuttle valve tending to move said right shuttle valve into a first position in which said right shuttle valve line is placed in communication with said second power cylinder line, a second shuttle shift pilot line connecting said dispense mode supply line with an opposite end of said right shuttle valve wherein pressure in said dispense mode supply line tends to move said right shuttle valve to a second position in which said dispense mode supply line is connected to said second power cylinder line and lastly including selectively operable flow regulator means connected to said double pilot control valve for regulating the flow of exhaust air from said power cylinder;

adjustable stop means for limiting the extend of movement of said power cylinder and said dispensing piston in said first direction to permit adjustment of the amount of liquid basting material drawn into said dispensing chamber in accordance with a predetermined value dependent upon the weight of the object into which the liquid basting material is to be injected;

a check valve in said supply conduit for permitting flow of basting material from said reservoir to said fill conduit while preventing reverse flow back to said reservoir; and indicator means for indicating the amount of liquid basting material that can be drawn into said dispensing chamber for any adjusted position of said abutment means.

* * * * *